June 12, 1945.   F. J. FIELITZ ET AL   2,377,928
STRETCHING CAST ELONGATE BODIES
Filed June 19, 1942
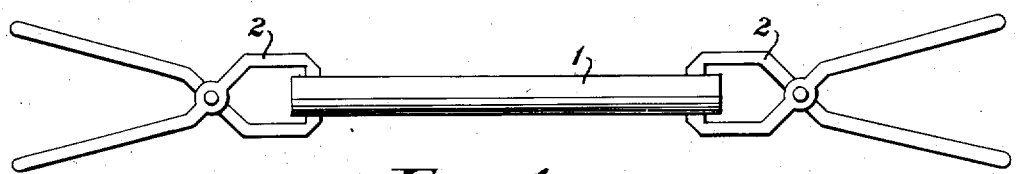
Fig. 1
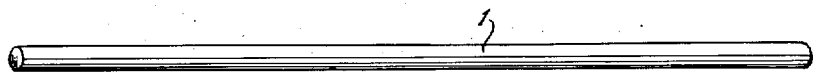
Fig. 2
Fig. 3
 
Fig. 4   Fig. 5
Frederick J. Fielitz
Barnard M. Marks   INVENTORS
BY
*J. M. Castle*
ATTORNEY Patented June 12, 1945

2,377,928

UNITED STATES PATENT OFFICE 2,377,928

STRETCHING CAST ELONGATE BODIES

Frederick J. Fielitz, Belleville, and Barnard M. Marks, Newark, N. J., assignors to E. I. du Pont de Nemours & Company, Wilmington, Del., a corporation of Delaware Application June 19, 1942, Serial No. 447,676

2 Claims. (Cl. 18—48)

This invention relates to the stretching of cast elongate bodies and, more particularly, to uniform caliper reduction of cast tubes and rods of polymerized esters of acrylic and methacrylic acids.

The production of cast tubes, rods, and other elongate bodies made of polymerized esters of acrylic or methacrylic acids is well known. In general, this is accomplished by polymerizing the monomeric compound or, alternatively, a syrup comprising polymer dissolved in monomer, in molds of the desired shape. C. M. Fields, U. S. Patent 2,057,674 discloses a means of producing such cast elongate bodies.

Further, such cast elongate bodies are frequently made exhibiting an integral sheen which results from light reflecting lamellae distributed through the polymer and oriented concentrically with respect to the major axis thereof. Fields and Wilkens, U. S. Patent 2,168,331 discloses a method of preparing cast rods exhibiting this integral sheen and Clewell and Fields, U. S. Patent 2,265,226 discloses a method of preparing cast tubes exhibiting this integral sheen.

An object of the present invention is to provide an economical method of stretching cast elongate bodies of polymerized esters of acrylic and methacrylic acids. A further object is to provide a method of stretching such bodies to give a uniform caliper reduction thereof without the use of a die. A more particular object is to provide a method of stretching such elongate bodies exhibiting an integral sheen due to the concentric orientation of light reflecting lamellae therein with respect to the major axis, without impairing the integral sheen. A still further object is to provide a simple and economical method of producing polymerized acrylate and methacrylate articles of ornamental and useful shapes. Other objects will be apparent from the description of the invention given hereinafter.

The above objects are accomplished according to the present invention by heating a cast elongate body essentially composed of a polymerized ester of acrylic or methacrylic acid, until it is soft, stretching the elongate body in the direction of its major axis by application of tension at both ends thereof, and cooling the stretched body before relieving the tension. The invention further comprises treating in the above manner a cast elongate body exhibiting integral sheen due to the concentric orientation of light reflecting lamellae therein with respect to the major axis thereof and, also, the steps of machining a smaller body from the stretched elongate body and thereafter heating said smaller body until it is soft, to permit it to shrink.

The invention may be carried out by immersing the cast elongate body in an oil bath maintained above the softening point of the resin of which the cast body is made, until it is softened and then stretching it a predetermined extent by tension applied at both ends. After this stretching it is permitted to remain in the oil bath a few minutes for surface annealing, following which it is removed and plunged quickly into a cooling bath of oil or water, preferably at room temperature or below, the elongate body being held under restraining tension until it has cooled to below its softening point. Alternatively, the elongate body may be first heated in an oil bath until it becomes soft, then may be removed and stretched in air, returned to the oil bath for annealing while held under restraining tension, again removed and quickly cooled. The annealing treatment has the added effect of correcting fortuitous variations in diameter over the length of the rod.

The percentage of elongation of the elongate body will depend upon the size reduction in diameter desired, the lengths before and after stretching being inversely proportional to the squares of the respective diameters. Where an elongate body has been reduced to less than the desired diameter by stretching, a controlled amount of shrinkage may be permitted during the annealing treatment to increase the diameter to the desired extent.

It has been discovered that uniform cast acrylic and methacrylic ester polymer bodies treated as above maintain their uniformity. Sections cut from such stretched bodies may be uniformly shrunk to sections of a different shape by being heated to the softening point while permitting free contraction. For example, spheres cut from a stretched cast rod become ellipsoidal when so treated. By varying the shape of the initial section cut from the stretched elongate body, final products may be obtained which range from flat ellipsoids to objects whose breadth is much greater than the diameter.

The invention will be further described with reference to the accompanying drawing wherein:

Fig. 1 is an elevation, more or less diagrammatical, of a rod being stretched in accordance with the present invention;

Fig. 2 is an elevation of the rod shown in Fig. 1 after being stretched;

Fig. 3 shows a section of an elongate body which has been stretched in accordance with the present invention;

Fig. 4 shows a sphere cut from the section shown in Fig. 3; and

Fig. 5 illustrates the shape obtained by treating the sphere of Fig. 4 in accordance with the present invention.

Referring to Fig. 1, a cast rod 1 is shown before stretching, pliers 2 being illustrated in position to apply tension at both ends of the rod. This stretching of the rod by application of tension may conveniently be carried out manually although it may be done by automatic machine if desired.

Fig. 2 illustrates the rod 1 of Fig. 1 after it has been stretched, showing that, despite the relatively great elongation of the rod and corresponding reduction in diameter, it still is uniform in caliper.

One specific variation of the invention is useful in obtaining plastic bodies of unusual shapes with great economy. A rod is stretched in the manner of this invention and a short section 5 of it is used for the purpose (see Fig. 3). From this section 5 is cut a sphere 6 (Fig. 4) by any means conventional in the art. The sphere 6 is then heated until it reaches the softening point of the resin of which it is composed and permitted to shrink in the absence of restraining influence with the result that a body 7 (Fig. 5) of ellipsoidal shape is obtained. Following this procedure but cutting bodies of other shapes from the stretched rod will result in obtaining an assortment of shapes, both ornamental and useful, that could only be obtained heretofore by the most skillful machine at much greater cost.

The following examples are given to illustrate specific embodiments of the invention:

Example I

A uniform pearl rod formed by polymerizing methyl methacrylate monomer containing pearl essence to a solid body in a mold in accordance with the procedure in the aforementioned U. S. Patent 2,168,331, having a length of 24 inches and a diameter of ½ inch, is immersed in a bath of pure mineral oil maintained at 325° F. After it has become limp and flexible, it is seized at its ends with pliers and manually stretched to 42.7 inches, after which it is permitted to remain in the bath under restraining tension for an additional five minutes. It is then removed and quickly plunged into a bath of mineral oil having a temperature of 60° F where it hardens almost instantly. The rod is found to have a uniform diameter of ⅜ inch, to be free from imperfections, and to possess its initial quality of integral sheen.

Example II

A cast polymethyl methacrylate pearl rod 12 inches long and ½ inch in diameter is immersed in a bath of pure mineral oil held at 300° F until it has softened. It is then removed, quickly stretched in the air to about 30.7 inches, and permitted to cool under restraining tension while exposed to the atmosphere. Examination discloses that caliper of the rod varies slightly from place to place along its length. The rod is reimmersed in the oil bath and permitted to remain there under restraining tension for ten minutes, following which it is removed and plunged quickly in a horizontal position into water having a temperature of 70° F. The rod now has a uniform caliper of 7/16 inch, is free from imperfections, and has the same quality of integral sheen which it originally possessed.

Example III

A transparent cast polymethyl methacrylate rod 12 inches long and ⅝ inch in diameter is immersed in an oil bath having a temperature of 340° F. until it becomes limp. It is then removed and stretched to a length of 37 inches in the air, following which it is plunged, while in a horizontal position, into a bath of cold water. The rod is found to lack uniformity of caliper and to have a diameter averaging less than ⅜ inch. It is again softened in the oil bath under conditions which permit shrinkage to a length of 33⅓ inches. Two minutes after shrinkage has occurred, the rod is removed and cooled in a water bath as before, restraining tension being maintained until cooling has proceeded to a point at which danger of further shrinkage has ceased to exist. The resulting rod is perfectly transparent and uniform over its entire length.

Example IV

A transparent polymethyl methacrylate tube, formed by rotary casting, 12 inches long, having an outside diameter of 23/16 inch, an inside diameter of 19/16 inch and a wall thickness of ⅛ inch, is softened in an oil bath having a temperature of 250° F. and stretched with uniform tension applied at its ends to a length of 19.6 inches, following which it is permitted to remain in the bath for five minutes. It is then removed and quickly plunged, while held in a horizontal position, into a bath of oil at room temperature. The resulting rod is found to be perfectly transparent and of uniform dimensions over its entire length. Its outside diameter is 18/16 inch, its inside diameter 15/16 inch and its wall thickness 3/32 inch.

Example V

A transparent cast polymethyl methacrylate rod 11.1 inches long and ¾ inch square in cross-section, is softened in an oil bath and stretched, while immersed, to a length of 16 inches, following which it is annealed and cooled as in Example I. The stretched rod has a uniform cross-section throughout its length of ⅝ inch square.

Example VI

A cast polymethyl methacrylate pearl rod 12 inches long and ½ inch in diameter is stretched in accordance with the procedure outlined in Example I to a length of 22.2 inches. The resulting rod has a uniform caliper throughout its length of 0.368 inch. From this rod is cut a sphere having a diameter of 0.364 inch. The sphere is immersed in an oil bath maintained at a temperature of 300° F. where, after a short time, it suddenly assumes the shape of a flat ellipsoid. It is removed from the hot liquid and plunged into a bath of oil maintained at room temperature. The ellipsoid has a major diameter 0.494 inch and a minor diameter of 0.191 inch. The provision of a suitable fastening device makes an attractive button of the ellipsoid.

It will be understood that the above examples are merely illustrative and that, in its broad aspect, the invention comprises heating a cast acrylate of methacrylate elongate body to its softening point, stretching it by application of tension at both its ends, and cooling it while it is kept under restraining tension.

It has been found that best results are obtained when the stretched elongate body is cooled at a substantially even rate over the entire length thereof. It is preferred to perform this operation quickly by plunging the body, while in a horizontal position, vertically downward into a cooling bath of oil or water. The body may, however, be permitted to cool in air, if completely uniform conditions, including freedom from drafts, are provided. The body may also be cooled by immersion, while held in a vertical position and under exactly constant restraining tension, vertically downward into the bath, although this method is not preferred.

Any liquid which does not react with, dissolve or otherwise adversely affect the resin and which is stable and sufficiently non-volatile at the required temperature, may be used as a heating medium. While ordinarily less convenient, it is likewise feasible to soften the elongate body by exposure to heated air.

The invention is applicable to cast elongate bodies composed of polymerized esters of acrylic and methacrylic acid. The specific composition of the resin forming the cast body is not critical in that any of the esters whose polymer is reasonably thermoplastic, may be used, as well as interpolymers of such esters with each other and, in minor proportions, other polymerizable compounds. Also, the usual modifiers, coloring matter, effect materials, and the like, may be included without causing complications in carrying out the invention. Of course, a preferred embodiment of the invention is the stretching of cast elongate bodies having light reflecting lamellae therein oriented concentrically with respect to the major axis of the body, since the present procedure allows the stretching of such bodies without adversely affecting their integral sheen.

Polymethyl methacrylate is the preferred resin for cast bodies to be treated according to this invention, partly because it behaves well in the treatment and partly because there is more demand for cast bodies of this resin. But the invention works satisfactorily with polymers of ethyl methacrylate, methyl and ethyl acrylate, and the like, as well as with the widest variety of interpolymers of methyl methacrylate with minor proportions of other polymerizable compounds.

Bodies which have been stretched and hardened may be machined into pieces of various shapes, and the pieces subsequently heated to the softening point while permitting free shrinkage. In this way, there may be made easily and cheaply, by simple machining, articles of interesting and ornamental shapes which could otherwise be formed only by more expensive tooling operations.

Aside from the obvious advantages of the present invention, it is of particular advantage in forming the smaller sizes of cast rod and tubing and, in fact, no practical method is known to applicants of making the smaller sizes of cast tubing exhibiting integral sheen other than the method herein disclosed.

As many apparently widely different embodiments of this invention may be made without departing from the spirit and scope thereof, it is to be understood that the invention is not limited to the specific embodiments thereof except as defined in the appended claims.

We claim:

1. Process of treating a cast rod of a thermoplastic resin from the group consisting of the polymerized esters of acrylic and methacrylic acids, which comprises heating said rod to its softening point, stretching said rod in the direction of its major axis by application of tension at both ends thereof, cooling said stretched rod while keeping it under restraining tension, and, thereafter, cutting a curved surface body from said stretched rod and heating said body to its softening point to permit said body to shrink.

2. Process of treating a cast rod of polymethyl methacrylate having light reflecting lamellae distributed therethrough and oriented concentrically with respect to the major axis thereof, which comprises heating said rod to its softening point, stretching said rod in the direction of its major axis by application of tension at both ends thereof, and cooling said stretched rod while keeping it under restraining tension, and, thereafter, cutting a curved surface body from said stretched rod and heating said body to its softening point to permit said body to shrink.

FREDERICK J. FIELITZ.
BARNARD M. MARKS.

---

CERTIFICATE OF CORRECTION.

Patent No. 2,377,928. June 12, 1945.

FREDERICK J. FIELITZ, ET AL.

It is hereby certified that error appears in the printed specification of the above numbered patent requiring correction as follows: Page 2, first column, line 36, for "maching" read --machining--; and second column, line 6, Example III, for "5/6 inch" read --5/8 inch--; line 69, Example VI, for the word "of" before "methacrylate" read --or--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.

thereof. It is preferred to perform this operation quickly by plunging the body, while in a horizontal position, vertically downward into a cooling bath of oil or water. The body may, however, be permitted to cool in air, if completely uniform conditions, including freedom from drafts, are provided. The body may also be cooled by immersion, while held in a vertical position and under exactly constant restraining tension, vertically downward into the bath, although this method is not preferred.

Any liquid which does not react with, dissolve or otherwise adversely affect the resin and which is stable and sufficiently non-volatile at the required temperature, may be used as a heating medium. While ordinarily less convenient, it is likewise feasible to soften the elongate body by exposure to heated air.

The invention is applicable to cast elongate bodies composed of polymerized esters of acrylic and methacrylic acid. The specific composition of the resin forming the cast body is not critical in that any of the esters whose polymer is reasonably thermoplastic, may be used, as well as interpolymers of such esters with each other and, in minor proportions, other polymerizable compounds. Also, the usual modifiers, coloring matter, effect materials, and the like, may be included without causing complications in carrying out the invention. Of course, a preferred embodiment of the invention is the stretching of cast elongate bodies having light reflecting lamellae therein oriented concentrically with respect to the major axis of the body, since the present procedure allows the stretching of such bodies without adversely affecting their integral sheen.

Polymethyl methacrylate is the preferred resin for cast bodies to be treated according to this invention, partly because it behaves well in the treatment and partly because there is more demand for cast bodies of this resin. But the invention works satisfactorily with polymers of ethyl methacrylate, methyl and ethyl acrylate, and the like, as well as with the widest variety of interpolymers of methyl methacrylate with minor proportions of other polymerizable compounds.

Bodies which have been stretched and hardened may be machined into pieces of various shapes, and the pieces subsequently heated to the softening point while permitting free shrinkage. In this way, there may be made easily and cheaply, by simple machining, articles of interesting and ornamental shapes which could otherwise be formed only by more expensive tooling operations.

Aside from the obvious advantages of the present invention, it is of particular advantage in forming the smaller sizes of cast rod and tubing and, in fact, no practical method is known to applicants of making the smaller sizes of cast tubing exhibiting integral sheen other than the method herein disclosed.

As many apparently widely different embodiments of this invention may be made without departing from the spirit and scope thereof, it is to be understood that the invention is not limited to the specific embodiments thereof except as defined in the appended claims.

We claim:

1. Process of treating a cast rod of a thermoplastic resin from the group consisting of the polymerized esters of acrylic and methacrylic acids, which comprises heating said rod to its softening point, stretching said rod in the direction of its major axis by application of tension at both ends thereof, cooling said stretched rod while keeping it under restraining tension, and, thereafter, cutting a curved surface body from said stretched rod and heating said body to its softening point to permit said body to shrink.

2. Process of treating a cast rod of polymethyl methacrylate having light reflecting lamellae distributed therethrough and oriented concentrically with respect to the major axis thereof, which comprises heating said rod to its softening point, stretching said rod in the direction of its major axis by application of tension at both ends thereof, and cooling said stretched rod while keeping it under restraining tension, and, thereafter, cutting a curved surface body from said stretched rod and heating said body to its softening point to permit said body to shrink.

FREDERICK J. FIELITZ.
BARNARD M. MARKS.

---

CERTIFICATE OF CORRECTION.

Patent No. 2,377,928. June 12, 1945.

FREDERICK J. FIELITZ, ET AL.

It is hereby certified that error appears in the printed specification of the above numbered patent requiring correction as follows: Page 2, first column, line 36, for "maching" read --machining--; and second column, line 6, Example III, for "5/6 inch" read --5/8 inch--; line 69, Example VI, for the word "of" before "methacrylate" read --or--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.